United States Patent
Ranjan et al.

(10) Patent No.: US 11,689,415 B2
(45) Date of Patent: *Jun. 27, 2023

(54) CREATING A HIGHLY-AVAILABLE PRIVATE CLOUD GATEWAY BASED ON A TWO-NODE HYPERCONVERGED INFRASTRUCTURE CLUSTER WITH A SELF-HOSTED HYPERVISOR MANAGEMENT SYSTEM

(71) Applicant: Hewlett Packard Enterprise Development LP, Houston, TX (US)

(72) Inventors: Jyoti Ranjan, Bangalore Karnataka (IN); Aboubacar Diare, Antelope, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 29 days.

This patent is subject to a terminal disclaimer.

(21) Appl. No.: 17/304,073

(22) Filed: Jun. 14, 2021

(65) Prior Publication Data

US 2021/0392041 A1 Dec. 16, 2021

Related U.S. Application Data (63) Continuation of application No. 16/902,423, filed on Jun. 16, 2020, now Pat. No. 11,038,752.

(51) Int. Cl.
*H04L 12/24* (2006.01)
*H04L 29/08* (2006.01)
(Continued)

(52) U.S. Cl.
CPC .......... *H04L 41/0806* (2013.01); *G06F 8/61* (2013.01); *G06F 9/45558* (2013.01);
(Continued)

(58) Field of Classification Search
CPC .............. H04L 12/462; H04L 12/4641; H04L 12/4633; H04L 41/0806; H04L 29/06612;
(Continued)

(56) References Cited

U.S. PATENT DOCUMENTS 9,612,926 B2 * 4/2017 Cao .................. G06F 11/142
9,882,969 B2 1/2018 Reddy et al.
(Continued)

FOREIGN PATENT DOCUMENTS

| WO | WO-2014184800 | 11/2014 |
| WO | WO-2016018680 | 2/2016 |
| WO | WO-2019094522 | 5/2019 |

OTHER PUBLICATIONS https://www.nakivo.com/blog/hyper-v-high-availability-works/ (Year: 2019).*

(Continued)

*Primary Examiner* — Kostas J Katsikis
(74) *Attorney, Agent, or Firm* — Trop, Pruner & Hu, P.C.

(57) ABSTRACT

Embodiments described herein are generally directed to a creation of an HA private cloud gateway based on a two-node HCI cluster with a self-hosted HMS. According to an example, a request to register a private cloud to be supported by on-premises infrastructure is received by a SaaS portal, which causes a base station to discover servers within the on-premises infrastructure. The base station is then instructed to prepare a server as a deployment node for use in connection with creation of a cluster of two HCI nodes of the servers to represent the HA private cloud gateway, including installing a seed HMS on the deployment node. The base station is further instructed to cause the seed HMS to create the cluster, install a self-hosted HMS within the (Continued)

cluster to manage the cluster, register the cluster to the self-hosted HMS, and finally delete the seed HMS from the deployment node.

20 Claims, 5 Drawing Sheets

(51) Int. Cl.
| | |
|---|---|
| G06F 8/61 | (2018.01) |
| G06F 9/455 | (2018.01) |
| H04L 12/46 | (2006.01) |
| H04L 41/0806 | (2022.01) |
| H04L 67/10 | (2022.01) |

(52) U.S. Cl.
CPC .......... *H04L 12/4641* (2013.01); *H04L 67/10* (2013.01); *G06F 2009/45595* (2013.01)

(58) Field of Classification Search
CPC ......... H04L 45/00; H04L 49/00; H04L 67/10; G06F 9/45558; G06F 9/46; G06F 2009/45595; G06F 8/61
See application file for complete search history.

(56) References Cited

U.S. PATENT DOCUMENTS

| | | | |
|---|---|---|---|
| 10,067,780 B2 | 9/2018 | Chang et al. | |
| 10,097,620 B2 | 10/2018 | Reddy et al. | |
| 10,148,493 B1 | 12/2018 | Ennis, Jr. et al. | |
| 10,389,586 B2 | 8/2019 | Hockett et al. | |
| 10,447,538 B2 | 10/2019 | Maes | |
| 10,498,837 B1 | 12/2019 | Bondalapati et al. | |
| 10,534,629 B1 | 1/2020 | St. Pierre et al. | |
| 10,686,755 B2 | 6/2020 | Nirwal et al. | |
| 10,848,379 B2 | 11/2020 | Sharma et al. | |
| 10,860,362 B2 | 12/2020 | Lal | |
| 10,909,009 B2 | 2/2021 | Ali et al. | |
| 2015/0331763 A1* | 11/2015 | Cao ...................... | G06F 11/0712 714/3 |
| 2017/0279692 A1 | 9/2017 | Llagostera et al. | |
| 2017/0353531 A1 | 12/2017 | Conn | |
| 2018/0077007 A1 | 3/2018 | Olson | |
| 2018/0115468 A1 | 4/2018 | Bildhauer et al. | |
| 2018/0287864 A1 | 10/2018 | Hockett et al. | |
| 2019/0253311 A1 | 8/2019 | Hockett et al. | |
| 2020/0004570 A1* | 1/2020 | Glade ................... | G06F 9/5077 |
| 2020/0007408 A1* | 1/2020 | Siddappa ............ | H04L 41/0659 |
| 2020/0218561 A1 | 7/2020 | Lal et al. | |
| 2020/0344325 A1* | 10/2020 | Sarisky ................ | H04L 41/082 |
| 2020/0396127 A1 | 12/2020 | Lochhead et al. | |
| 2020/0396179 A1 | 12/2020 | Lochhead et al. | |
| 2021/0036889 A1 | 2/2021 | Jain et al. | |
| 2021/0173695 A1* | 6/2021 | Dai ....................... | G06F 3/0631 |
| 2021/0216234 A1* | 7/2021 | Singler, Jr. ........... | G06F 9/45558 |
| 2021/0255885 A1* | 8/2021 | Purohit ................. | G06F 3/067 |
| 2021/0334178 A1* | 10/2021 | Yang .................... | G06F 11/3495 |

OTHER PUBLICATIONS

Kristopher Jon Turner, "Building a Microsoft Hyper-Converged Private Cloud Solution," Apr. 7, 2017, pp. 1-2, Retrieved from the Internet on Feb. 10, 2020 at URL: <kristopherjturner.com/2017/04/07/building-a-microsoft-hyper-converged-private-cloud-solution/>.
Microsoft, "Hyper-V Network Virtualization Gateway Architectural Guide." Aug. 31, 2016, pp. 1-14, Retrieved from the Internet on Feb. 10, 2020 at URL: <docs.microsoft.com/en-us/previous-versions/windows/it-pro/windows-server-2012-r2-and-2012/jj618319(v%3Dws.11)>.

* cited by examiner

CREATING A HIGHLY-AVAILABLE PRIVATE CLOUD GATEWAY BASED ON A TWO-NODE HYPERCONVERGED INFRASTRUCTURE CLUSTER WITH A SELF-HOSTED HYPERVISOR MANAGEMENT SYSTEM

BACKGROUND

Due to the maturity, robustness, flexibility and simplicity of cloud computing architecture, the cloud is now ubiquitous and customers may obtain infrastructure services through various public cloud vendors. For a variety of reasons, however, such as security, cost, latency, and the like, customers may be reluctant to put every workload in the public cloud. As such, there remains a need for on-premises hosted cloud (referred to as "private cloud") as well as a cloud computing environment that uses a mix of private cloud and public cloud services (referred to as "hybrid cloud") for scenarios in which customers would like to make use of both.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are generally directed to a creation of a High-Availability (HA) private cloud gateway based on a two-node Hyperconverged Infrastructure (HCI) cluster with a self-hosted Hypervisor Management System (HMS). In the following description, numerous specific details are set forth in order to provide a thorough understanding of example embodiments. It will be apparent, however, to one skilled in the art that embodiments described herein may be practiced without some of these specific details.

Cloud customers currently have the ability to manage the private cloud like a service through web-based Software-as-a-Service (SaaS) portals. A typical architecture for performing SaaS-based private cloud management includes three core components: the SaaS portal, a private cloud gateway and a managed private cloud (e.g., in the form of an Infrastructure-as-a-Service (IaaS) cloud). SaaS-based private cloud management relies on the existence of the private cloud gateway that acts as an intermediary for communications between the SaaS portal and the private cloud, for example, for cloud operations, such as provisioning, configuration, monitoring, and management. A variety of approaches exist to facilitate creation of a private cloud gateway on behalf of cloud customers; however, none are entirely satisfactory as they all suffer from one or more of the following limitations:

The need for human intervention to create the private cloud gateway infrastructure; and A resulting sub-optimal hardware footprint (e.g., a larger hardware footprint than theoretically required to achieve high-availability as a result of using of an independent host or cluster to run an HMS to manage the private cloud gateway infrastructure.

A representative example of existing approaches for creating a private cloud gateway involves taking inventory of the hardware available within an on-premises hosted cloud data center. Then, an administrator creates the private cloud gateway using the available hardware with a minimalistic hardware footprint, but with desired high-availability. The private cloud gateway is then configured by the administrator to run a set of infrastructure agents to manage the private cloud, which helps in private cloud management as well as addresses end users' desire to create an IaaS cloud to which user workloads can be deployed. As it is desirable for the IaaS to be capable of being managed 24×7, 365 days in year without interruption, the private cloud gateway should support high availability of the HMS as well as the various services deployed for private cloud management that leverage native HMS HA solutions provided therein.

Most existing approaches for creation of a private cloud gateway use independent infrastructure to host the HMS in HA mode, thereby resulting in a sub-optimal hardware footprint (e.g., a solution involving three-nodes or more) as noted above. These sub-optimal HA private cloud gateway architectures require at least three nodes, one running a Hypervisor Management System (HMS) and a two-node HCI cluster. If the HA private cloud gateway could be reduced to two nodes, enormous cost and space efficiencies are achievable across the relevant set of current and future cloud customers. It is theoretically possible to have the HMS run within the HCI cluster, which would allow elimination of the separate infrastructure to host the HMS; however, existence of the HMS is a precondition to creation of the HCI cluster. This situation raises the age-old conundrum of the "chicken or egg" paradox. As such, one challenge to be overcome in connection with reducing the hardware footprint of an HA private cloud gateway is identifying how to migrate the HMS, which is running on a separate host (or cluster), to the HCI cluster that it is going to manage. Additionally, in order to make the solution attractive to cloud consumers, the entire process (e.g., creation of the HA private cloud gateway, deployment of the HCI cluster, and configuration of the HMS in HA mode) should be as automated as possible.

Embodiments described herein seek to achieve the goal of programmatically creating an HA private cloud gateway that may be limited to a two-node HCI cluster by, among other things, making use of resources external to the private cloud and external to the private cloud gateway to bootstrap the hardware that will make up the private cloud gateway. As described further below, with reference to FIG. 1, a number of geographically distributed stations (each of which may be referred to herein as a base station) may be deployed, for example, by a cloud service provider, a cloud computing infrastructure manufacturer, and/or a cooperative group thereof. One of the base stations may serve as a proxy between a SaaS portal and a private cloud of an enterprise for use in connection with bootstrapping hardware on behalf of the enterprise.

According to one embodiment, a centralized SaaS portal facilitates (i) creation of a private cloud gateway based on HCI servers that are automatically and remotely discovered by the SaaS portal with zero or minimal human intervention by leveraging a geographically distributed network of base stations and a temporary HSM running on a deployment node to seed a two-server HCI cluster; and (ii) replacement of the temporary HMS by deploying a new, self-hosted HMS within the same two-server HCI cluster in HA mode, which the self-hosted HMS is to manage using re-registration of the HCI cluster to the self-hosted HMS.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

As used herein, a "Hypervisor Management System" or an "HMS" generally refers to a set of nodes running virtual software forming a cluster. Non-limiting examples of an HMS include a HyperV cluster, a VMware cluster, a Microsoft System Center cluster and a Nutanix cluster.

As used herein, a "self-hosted Hypervisor Management System" or a "self-hosted HMS" generally refers to an HMS that runs on a node of a cluster that is comprised of multiple nodes that is managed by the HMS.

As used herein, a "Hyperconverged infrastructure node" or an "HCI node" generally refers to a software-defined information technology infrastructure node that virtualizes various elements of conventional hardware-defined systems. An HCI node may include a combination of one or more of virtualized computing (e.g., a hypervisor), software-defined storage, and virtualized networking (software-defined networking). HCI solutions may run on commercial off-the-shelf servers. Some HCI solutions may also include a full set of software-defined services for compute, backup storage, networking, security and cloud management.

As used herein, a "base station" generally refers to a node of a distributed set of nodes that is used to bootstrap and prepare physical infrastructure for pre-day zero activities. As described further below, a base station may be managed by and/or directed by a centralized SaaS portal to perform various tasks on behalf of the SaaS portal in connection with creation of a private cloud gateway for a private cloud. A base station may be used to provide a secure launching pad from which to, among other things, install an operating system on an on-premises host, connect to the host via the secure shell (SSH) protocol, and run various scripts.

As used herein, a "private cloud gateway" generally refers to one or more servers that provides a set of services for managing various aspects of a private cloud, for example, under the direction of a SaaS portal. In various embodiments described herein, an HA private cloud gateway comprises a two-node HCI cluster.

Figure 1:
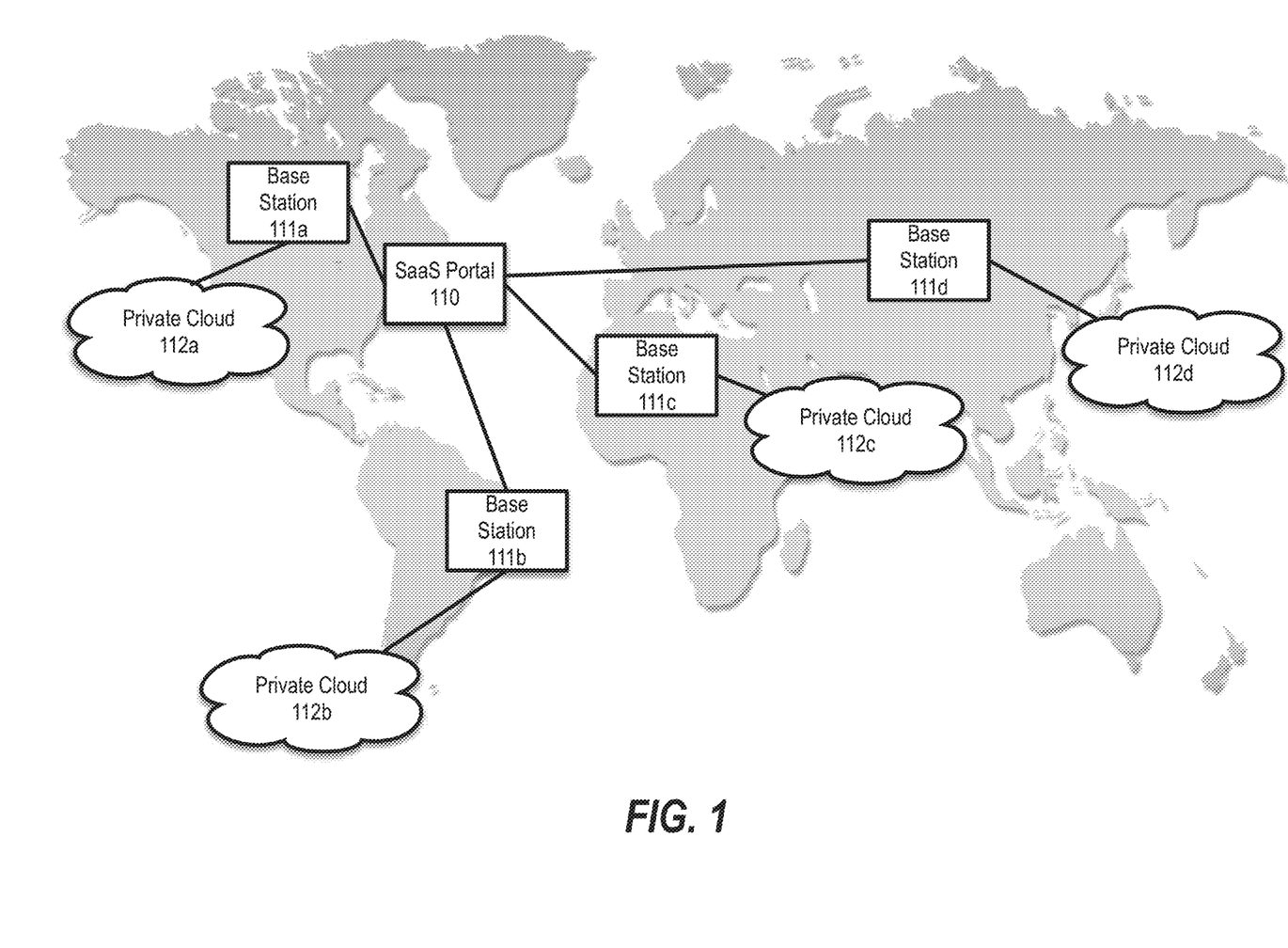
FIG. 1 is a high-level block diagram conceptually illustrating a solution to support creation of private cloud gateways in accordance with an example embodiment.

FIG. 1 is a high-level block diagram conceptually illustrating a solution to support creation of private cloud gateways in accordance with an example embodiment. According to one embodiment, a set of geographically distributed base stations 111a-d (which may be referred to herein collectively or generally as 111) are coupled in communication with a centralized SaaS portal 110. In the context of the present example, base station 111a is located in Canada or the northern region of the United States (US), base station 111b is located in Brazil or centrally located in South America, base station 111c is in north Africa or Europe, and base station 111d is located in Asia.

In one embodiment, base stations 111 may be deployed in different geographical regions, for example, to reduce communication latency with respective private clouds 112a-d (which may be referred to herein collectively or generally as 112). Those skilled in the art will appreciate the distribution illustrated herein is merely used as an example and that numerous other geographical distributions of base stations 111 may be employed based on various factors (e.g., customer demand in a particular region, network communication latencies in a particular region, concentration of private clouds in different geographies, etc.). For example, base station density in the US and Europe would likely be greater than that in Antarctica and/or other virtually uninhabited regions. In one embodiment, the base stations may be virtual machines (VMs) running in different availability zones of a public cloud. Alternatively, the base stations may be located in a private data center and exposed via a public address point.

After a private cloud gateway is established within a private cloud 112, SaaS portal 110 may provide remote accessibility to the private clouds 112 via the private cloud gateway. The SaaS portal 110 may represent a web-based portal through which cloud customers have the ability to manage on-premises infrastructure, for example, networking equipment, load balancers, storage arrays, backup devices, and servers within an on-premises hosted cloud data center. For example, SaaS portal 110 may provide a set of services which make use of a customer's private cloud gateway to perform various cloud management operations (e.g. discovery of nodes and deployment, updating, and upgrading of the customer's private cloud 112).

In embodiments described herein, the SaaS portal 110 manages and directs a base station 111 (e.g., one determined to be in geographic proximity to the private cloud 112 at issue) in connection with carrying out various automated tasks associated with setting up an HA private cloud gateway (e.g., creation of the HA private cloud gateway, deployment of an HCI cluster, and configuration of an HMS in HA mode within the HCI cluster) within the private cloud 112. For example, for an enterprise located in California seeking to establish SaaS-based private cloud management of private cloud 112a, SaaS portal 110 may select base station 111a to perform tasks associated with setting up a private cloud gateway (not shown) within private cloud 112a on behalf of the enterprise. Similarly, for a customer located in India desiring SaaS-based private cloud management of private cloud 112c, SaaS portal 110 may select base station 111c to perform tasks associated with setting up a private cloud gateway (not shown) within private cloud 112c on behalf of the customer.

While the SaaS portal 110 may be used to perform various on-premises cloud operations, including provisioning, configuration, monitoring, and management, embodiments described herein relate primarily to an intelligent mechanism for deployment of private cloud gateways within private clouds 112 from the SaaS portal 110 that, among other things, minimizes human intervention during the deployment process.

While in the above-described example, a set of four geographically distributed base stations 111 are shown, those skilled in the art will appreciate more or fewer base stations may be used. Additionally, while deploying base stations 111 in different geographical regions reduces latency for communications with proximate private clouds, the systems and methods herein may be use without such geographical distribution of base stations, albeit, with the associated trade-off of increased time for communications between the base stations and the respective private clouds. Those skilled in the art will also appreciate more or fewer private clouds 112 may be serviced via the SaaS portal 110 than shown in the present example.

Figure 2:
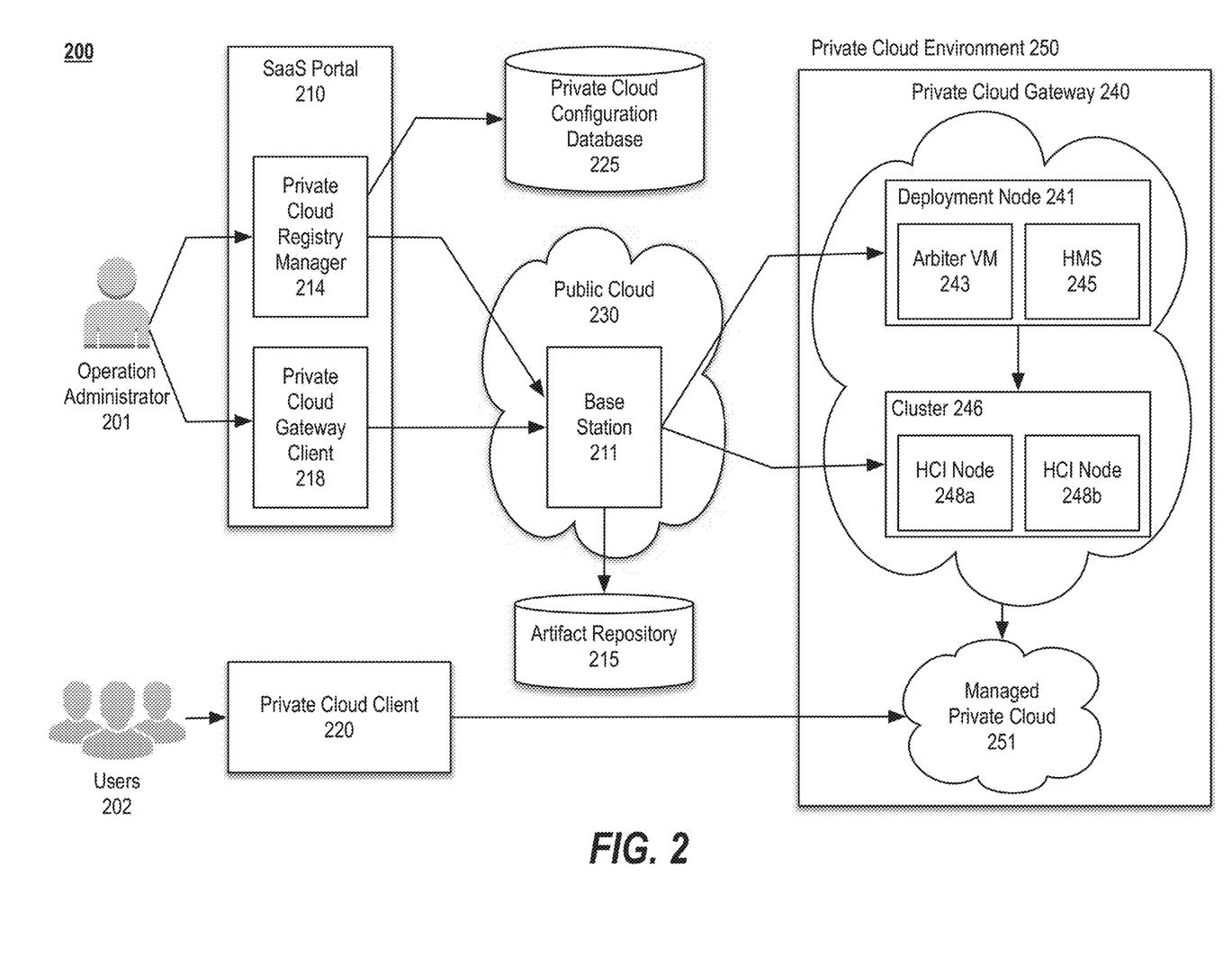
FIG. 2 is a block diagram conceptually illustrating a system architecture in accordance with an example embodiment.

FIG. 2 is a block diagram conceptually illustrating a system architecture 200 in accordance with an example embodiment. In the context of the present example, the system architecture 200 includes a SaaS portal 210, a private cloud configuration database 225, a public cloud 230, an artifact repository 215, and a private cloud environment 250 (e.g., one of private clouds 112). Also shown are a private cloud gateway 240 and a managed private cloud 251 that are created within the private cloud environment 250.

SaaS portal 210 may be a web-based SaaS portal as described above with reference to FIG. 1 and may include a private cloud registry manager 214 and a private cloud gateway client 218, through which an operation administrator 201 of an enterprise that is setting up the private cloud gateway 240 for management of the managed private cloud 251. According to one embodiment, the private cloud registry manager 214 may be responsible for performing a registration and discovery workflow, including receiving and persisting information input by the operation administrator 201 to facilitate creation of the private cloud gateway 240, directing the base station 211 (e.g., one of base stations 111) to discover servers available within the private cloud environment 250 that may be used to representing the private cloud gateway 240, and persisting results associated with the discovery process.

According to one embodiment, as part of the registration and discovery workflow, the private cloud registry manager 214 may be responsible for establishing a connection with the base station 211 and directing the base station to configure a private network environment using the enterprise's on-premises infrastructure. As noted above, the base station 211 may be specific to a geographical region in which the private cloud environment 250 resides. Responsive to the request from the private cloud registry manager 214, the base station 211 may dynamically establish the private network environment and use it to discover servers in the connect to physical infrastructure of the private cloud. In this manner, the use of base stations 111 enhances security as the internal Internet Protocol (IP) addresses of the private cloud environment need not be publicly exposed. Further details regarding an example of private cloud gateway creation processing are described below with reference to FIG. 3.

Responsive to a request from the operation administrator 201, the private cloud gateway client 218 may be responsible for performing a private cloud creation workflow, including deploying and configuring infrastructure for the private cloud gateway 240. According to one embodiment, the private cloud gateway client 218 may direct the base station 211 to run various scripts. For example, a first script may be run by the base station 211 to create a deployment node 241 hosting an HMS 245 (e.g., a seed or temporary HMS for creation of cluster 246) and an arbiter VM 243 (e.g., for installing management software associated with HCI nodes 248a-b), a second script may be run by the base station 211 to create the cluster 246 comprising the two HCI nodes 248a-b, and a third script may be run by the base station 211 to replace the temporary HMS with a new, self-hosted HMS (not shown) within the cluster 246 by re-registering the cluster 246 to the self-hosted HMS. During the private cloud creation workflow, the base station 211 may pull (e.g., download), and locally store within local storage associated with the base station 211 (not shown), appropriate artifacts (e.g., operating system ISO image files, an HMS image, installer package files, etc.) as needed from artifact repository 215. According to one embodiment a URI may be provided by the private cloud gateway client 218 that can be used by the operation administrator 201 to poll for successful completion of the assigned operation. Further details regarding an example of private cloud gateway creation processing are described below with reference to FIG. 3.

After the private cloud gateway creation workflow has been completed, the private cloud gateway 240 may participate in creating an IaaS stack within the managed private cloud 251 and the private cloud gateway 240 may be used to manage the physical infrastructure associated with the managed private cloud 251, for example, using tools, such as Ops Ramp, ServiceNow, etc.

According to one embodiment, the newly-created managed private cloud 251 may run various services that provide virtual infrastructure as a service using on-premises infrastructure, for example, physical hardware infrastructure within an on-premises hosted cloud data center of the enterprise. The services may be provided in the form of one or more turnkey appliances. Non-limiting examples of the services include OpenStack and Azure Stack.

While not directly related to the workflows described above, for purposes of completeness, a private cloud client 220 is shown through which users (e.g., users 202) of the managed private cloud 251 may make use of various compute, networking, and/or storage services (e.g., OpenStack or Azure Stack) that may be provided by the managed private cloud 251 based on the type of the private cloud created.

The SaaS portal 210 and the various services (e.g., the private cloud registry manager 214 and the private cloud gateway client 218) provided by the SaaS portal 210 described above with reference to FIG. 2 and the processing described below with reference to the flow diagram of FIG. 3 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer system described with reference to FIG. 5 below.

While in the context of various examples described herein, reference is made to various scripts, those skilled in the art will appreciate many of the operations performed by the scripts may alternatively be orchestrated through a well-defined Application Programming Interface (API) (e.g., a Representational State Transfer (REST) API). As such, depending upon the particular implementation, one or more of the various scripts could be deployed as services.

Figure 3:
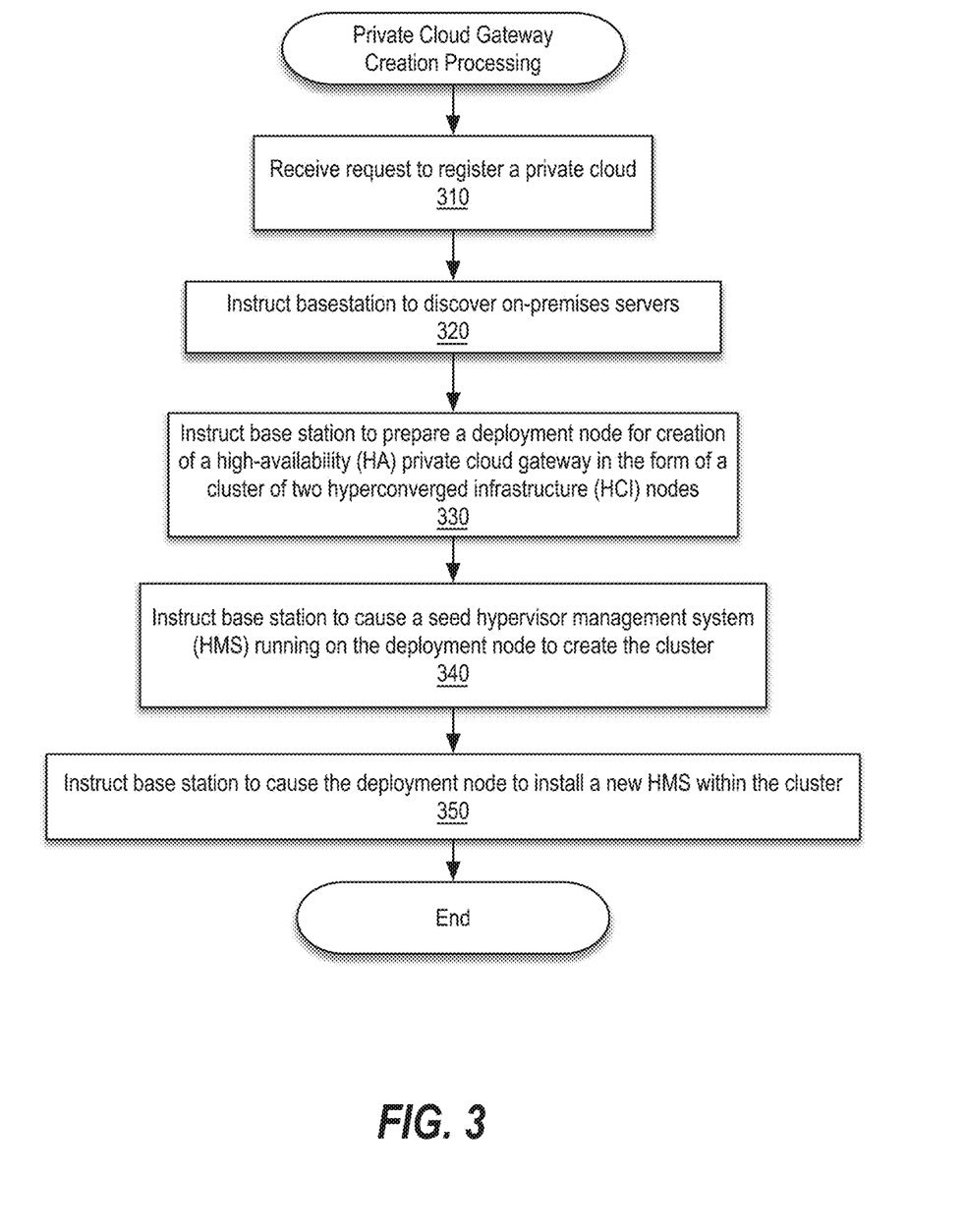
FIG. 3 is a flow diagram illustrating private cloud gateway creation processing in accordance with an example embodiment.

FIG. 3 is a flow diagram illustrating private cloud gateway creation processing in accordance with an example embodiment. In the context of the present example, the actions involved in creation of a private cloud gateway (e.g., private cloud gateway 240) for a private cloud (e.g., one of private clouds 112 or private cloud environment 250) are described from the perspective of a SaaS portal (e.g., SaaS portal 110 or 210). In other words, the blocks of FIG. 3 are performed by the SaaS portal.

At block 310, a request is received to register a private cloud. According to one embodiment, an administrator (e.g., operation administrator 201) of an enterprise that desires to enable SaaS-based private cloud management via the SaaS portal interacts with a user interface presented by the SaaS portal to provide various details to facilitate creation of private cloud gateway 240. According to one embodiment, the administrator may provide information (e.g., a Uniform Resource Locator (URL)) associated with an artifact repository (e.g., artifact repository 215) from which to pull various artifacts (e.g., operating system ISO image files, an HMS image, installer package files, etc.) for use during process of creating the private cloud gateway. The administrator may also input information for use in connection with identifying an appropriate base station (e.g., base station 111 or 211) that will be used during the process of creating the private cloud gateway. For example, the administrator may specify a particular base station by providing its IP address or the administrator may provide information regarding a geographical region in which the private cloud is located. Alternatively, an appropriate base station may be programmatically identified based on an IP address associated with the private cloud environment. The administrator may also input information (e.g., a private cloud name, an IP address of a server participating in the gateway, types of nodes and number of nodes) regarding the private cloud (e.g., private cloud 111 or private cloud environment 250) in which the managed private cloud (e.g., managed private cloud 251) is to be created.

At block 320, a base station is instructed to discover on-premises servers. According to one embodiment, a private network environment is dynamically created by the base station to facilitate a cloud connection using the on-premises physical infrastructure. For example, the base station may create a Virtual Private Cloud (VPC) within the public cloud in which the base station resides using the enterprise's on-premises infrastructure by running one or more scripts. Upon establishment of the private network environment, the base station may join the secure private network, use it to connect to the physical infrastructure of the private cloud, and discover the available servers in the private cloud environment. Upon completion of the discovery process, the base station may relay information regarding the discovered servers back to the private cloud registry manager 214, which may persist the information in the private cloud configuration database 225. For example, the base station may provide SaaS portal with the cluster name, cluster IP address and it elements (e.g., a set of nodes). Information regarding the discovered servers may also include server types and models, data about the hardware components and configuration of the servers (e.g., number of drives, size of the drives, Network Interface Controller (NIC) adapters, etc.). This information may also be used in connection with identifying the right servers to pair together in a cluster relationship in the event there are multiple servers available.

At block 330, the base station is instructed to prepare a deployment node for creation of an HA private cloud gateway in the form of a cluster of two HCI nodes. According to one embodiment, the SaaS portal directs the base station to run a script to create the deployment node (e.g., deployment node 241) on a bare metal server discovered during the discovery process. Creation of the deployment node may involve deploying and configuring a hypervisor node on a discovered server to host a seed or temporary HMS (e.g., HMS 245) and a VM that will host an arbiter and potentially other management tools for the HCI nodes (e.g., HCI nodes 284a-b).

Alternatively, as noted above, all or some portion of the deployment node preparation process may be provided in the form of a server deployment and configuration service. For example, a program can be invoked via a REST API to perform pre-defined configuration operations (e.g., update the server firmware, Install an operating system (hypervisor), deploy and configure the HMS, etc.).

At block 340, the base station is instructed to cause the seed HMS running on the deployment node to create the cluster. According to one embodiment, the SaaS portal directs the base station to run a script to make use of the seed HMS to create the cluster (e.g., cluster 246), which may be strictly limited to two HCI nodes (e.g., HCI nodes 284a-b).

At block 350, the base station is instructed to cause the deployment node to install a new HMS within the cluster. According to one embodiment, the new HMS will replace the seed HMS by un-registering the cluster from the seed HMS and re-registering the cluster with the new HMS. One or more scripts may be run by the base station to effectuate the installation of the new HMS and the re-registration, including one or more reconfiguration scripts to cause the cluster to properly reconnect to the new HMS. After successful transition of management of the cluster from the seed HMS to the new HMS, the seed HMS may be discarded. Further details regarding an example of a self-hosted HMS bootstrap process on a two-node HCI system are provided with reference to FIGS. 4A-F.

FIGS. 4A-F are block diagrams sequentially illustrating a self-hosted HMS bootstrap process on a two-node HCI system in accordance with an example embodiment. In the context of the present example, two server nodes 410a-b are shown, one of which may represent the deployment node (e.g., 241).

Figure 4A:
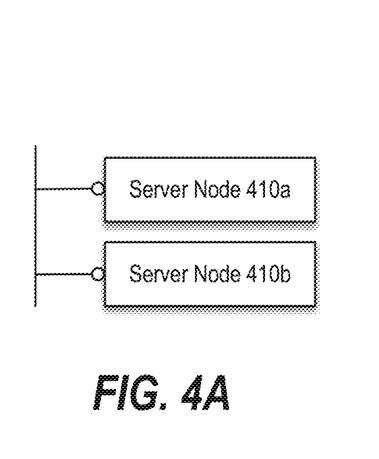
FIGS. 4A-F are block diagrams sequentially illustrating a self-hosted HMS bootstrap process on a two-node HCI system in accordance with an example embodiment.

In FIG. 4A, the two server nodes 410a-b are shown in an initial state in which both server nodes 410a-b are unconfigured and with no cluster running. In this state, no HA capability is available.

Figure 4B:
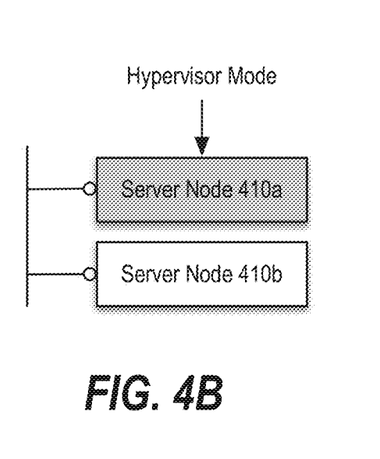

In FIG. 4B, one server node (e.g., server node 410a) is booted into hypervisor mode (which is indicated by the gray fill) and the other server node (e.g., server node 410b) may remain unconfigured.

Figure 4C:
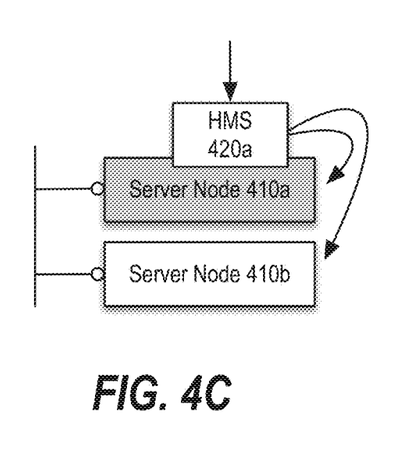

In FIG. 4C, HMS 420a (e.g., an HMS appliance (VM)) is deployed on the server node 410a that is in hypervisor mode and the HMS 420a is subsequently configured to manage both server nodes 410a-b.

Figure 4D:
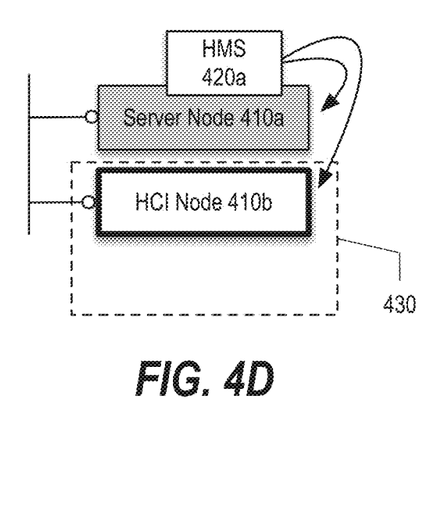

In FIG. 4D, server node 410b is deployed as an HCI node (which is indicated by the thicker outline) and will therefore be hereafter referred to as HCI node 410b. Additionally, a single-node HCI cluster 430 is configured and managed by the HMS 420a running on HCI node 410b.

Figure 4E:
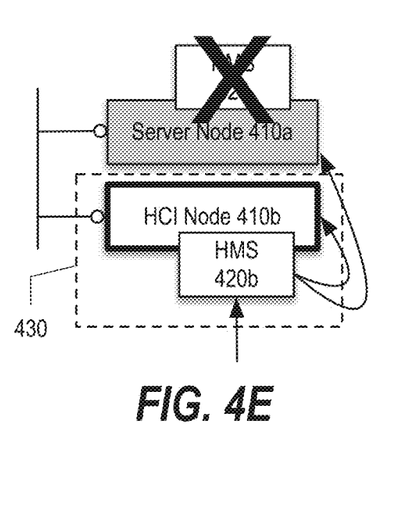

In FIG. 4E, a new HMS 420b is configured on the single-node HCI cluster 430 and is subsequently configured to manage both nodes 410a-b. Additionally, the initial HMS 420a is removed/deleted.

Figure 4F:
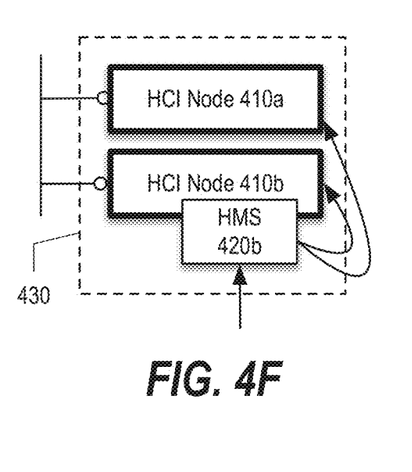

In FIG. 4F, server node 410a is deployed as an HCI node and managed by the HMS 420b running on HCI node 410b. Then, the former single-node HCI cluster is expanded into a two-node HCI cluster 430 with a self-hosted HMS 420b managing both nodes.

Embodiments described herein include various steps, examples of which have been described above. As described further below, these steps may be performed by hardware components or may be embodied in machine-executable instructions, which may be used to cause a general-purpose or special-purpose processor programmed with the instructions to perform the steps. Alternatively, at least some steps may be performed by a combination of hardware, software, and/or firmware.

Embodiments described herein may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/ machine-readable medium suitable for storing electronic instructions (e.g., computer programming code, such as software or firmware).

Various methods described herein may be practiced by combining one or more machine-readable storage media containing the code according to example embodiments described herein with appropriate standard computer hardware to execute the code contained therein. An apparatus for practicing various example embodiments described herein may involve one or more computing elements or computers (or one or more processors within a single computer) and storage systems containing or having network access to computer program(s) coded in accordance with various methods described herein, and the method steps of various example embodiments described herein may be accomplished by modules, routines, subroutines, or subparts of a computer program product.

Figure 5:
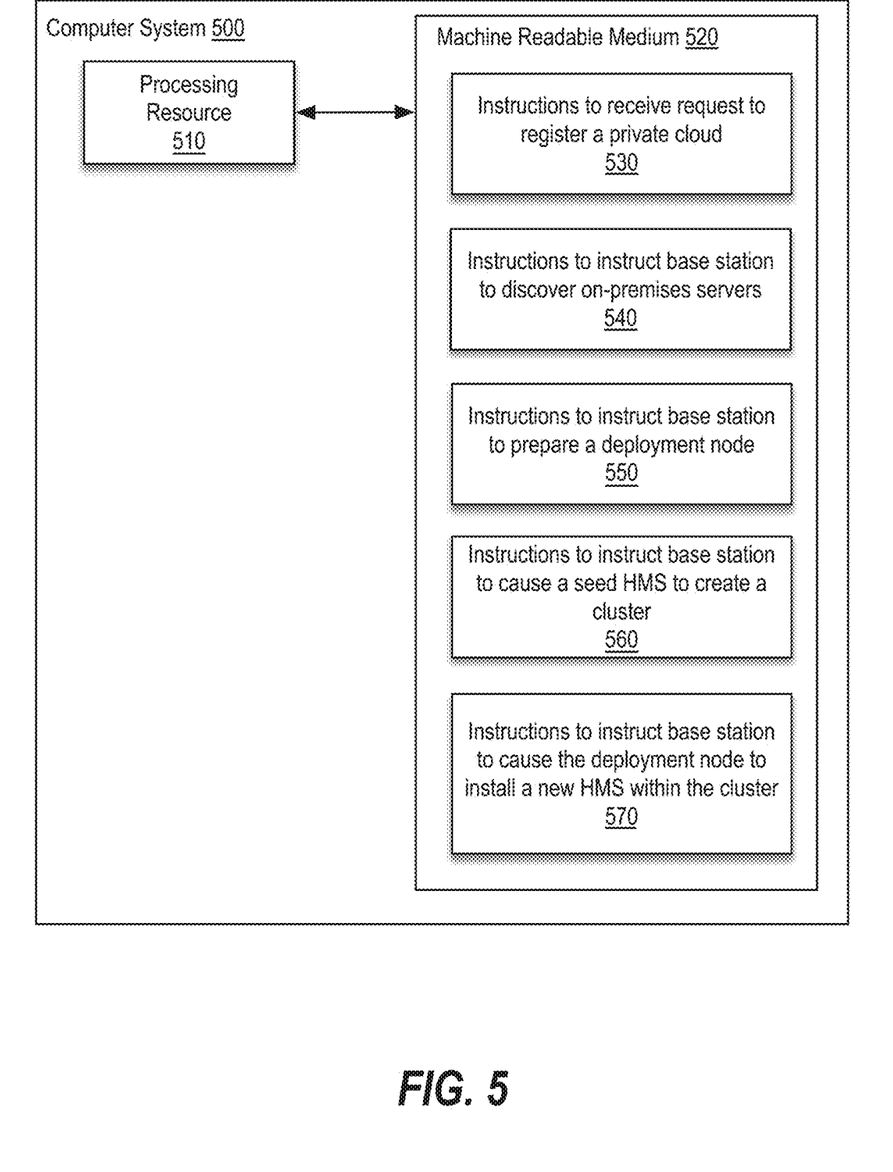
FIG. 5 is a block diagram of a computer system in accordance with an embodiment.

FIG. 5 is a block diagram of a computer system in accordance with an embodiment. In the example illustrated by FIG. 5, computer system 500 includes a processing resource 510 coupled to a non-transitory, machine readable medium 520 encoded with instructions to perform a private cloud gateway creation processing. The processing resource 510 may include a microcontroller, a microprocessor, central processing unit core(s), an ASIC, an FPGA, and/or other hardware device suitable for retrieval and/or execution of instructions from the machine readable medium 520 to perform the functions related to various examples described herein. Additionally or alternatively, the processing resource 510 may include electronic circuitry for performing the functionality of the instructions described herein.

The machine readable medium 520 may be any medium suitable for storing executable instructions. Non-limiting examples of machine readable medium 520 include RAM, ROM, EEPROM, flash memory, a hard disk drive, an optical disc, or the like. The machine readable medium 520 may be disposed within the computer system 500, as shown in FIG. 5, in which case the executable instructions may be deemed "installed" or "embedded" on the computer system 500. Alternatively, the machine readable medium 520 may be a portable (e.g., external) storage medium, and may be part of an "installation package." The instructions stored on the machine readable medium 520 may be useful for implementing at least part of the methods described herein.

In the context of the present example, the machine readable medium 520 is encoded with a set of executable instructions 530-570. It should be understood that part or all of the executable instructions and/or electronic circuits included within one block may, in alternate implementations, be included in a different block shown in the figures or in a different block not shown.

Instructions 530, upon execution, cause the processing resource 510 to receive a request to register a private cloud. In one embodiment, instructions 530 may correspond generally to instructions for performing block 310 of FIG. 3.

Instructions 540, upon execution, cause the processing resource 510 to instruct a base station to discover on-premises servers. In one embodiment, instructions 540 may correspond generally to instructions for performing block 320 of FIG. 3.

Instructions 550, upon execution, cause the processing resource 510 to instruct the base station to prepare a deployment node. In one embodiment, instructions 550 may correspond generally to instructions for performing the block 330 of FIG. 3.

Instructions 560, upon execution, cause the processing resource 510 to instruct the base station to cause a seed/ temporary HMS to create a cluster. In one embodiment, instructions 560 may correspond generally to instructions for performing block 340 of FIG. 3.

Instructions 570, upon execution, cause the processing resource 510 to instruct the base station to cause the deployment node to install a new, self-hosted HMS within the cluster. In one embodiment, instructions 560 may correspond generally to instructions for performing block 350 of FIG. 3.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed is:

1. A method comprising:
   instructing, by a computing device, a base station to install a seed hypervisor management system on a deployment node;
   instructing, by the computing device, the base station to cause the seed hypervisor management system running on the deployment node to create a hyperconverged infrastructure cluster managed by the seed hypervisor management system; and
   instructing, by the computing device, the base station to cause the deployment node to install a self-hosted hypervisor management system within the hyperconverged infrastructure cluster, the self-hosted hypervisor management system to manage the hyperconverged infrastructure cluster.

2. The method of claim 1, further comprising:
instructing, by the computing device, the base station to cause the deployment node to register the hyperconverged infrastructure cluster to the self-hosted hypervisor management system; and
instructing, by the computing device, the base station to cause the deployment node to delete the seed hypervisor management system from the deployment node.

3. The method of claim 1, wherein the hyperconverged infrastructure cluster includes only two nodes, and wherein the deployment node is included in the hyperconverged infrastructure cluster.

4. The method of claim 1, wherein the hyperconverged infrastructure cluster comprises a high-availability private cloud gateway, and wherein the computing device comprises a Software-as-a-Service (SaaS) portal device.

5. The method of claim 1, further comprising:
instructing, by the computing device, the base station to create a Virtual Private Cloud (VPC) within a public cloud that includes the base station.

6. The method of claim 1, further comprising:
receiving, by the computing device, a request to register a private cloud to be supported by an enterprise infrastructure; and
in response to the received request, the computing device instructing the base station to discover a plurality of servers within the private cloud.

7. The method of claim 6, further comprising:
identifying, by the computing device, the base station from among a plurality of geographically distributed base stations based on a geographical location of the private cloud.

8. A system comprising:
a processing resource; and
a non-transitory computer-readable medium, coupled to the processing resource, having stored therein instructions that when executed by the processing resource cause the processing resource to:
instruct a base station to install a seed hypervisor management system on a deployment node;
instruct the base station to cause the seed hypervisor management system running on the deployment node to create a hyperconverged infrastructure cluster managed by the seed hypervisor management system; and
instruct the base station to cause the deployment node to install a self-hosted hypervisor management system within the hyperconverged infrastructure cluster, the self-hosted hypervisor management system to manage the hyperconverged infrastructure cluster.

9. The system of claim 8, wherein the instructions further cause the processing resource to:
instruct the base station to cause the deployment node to register the hyperconverged infrastructure cluster to the self-hosted hypervisor management system; and
instruct the base station to cause the deployment node to delete the seed hypervisor management system from the deployment node.

10. The system of claim 8, wherein the hyperconverged infrastructure cluster includes only two nodes, and wherein the deployment node is included in the hyperconverged infrastructure cluster.

11. The system of claim 8, wherein the hyperconverged infrastructure cluster comprises a high-availability private cloud gateway, and wherein the system comprises a Software-as-a-Service (SaaS) portal system.

12. The system of claim 8, wherein the instructions further cause the processing resource to:
instruct the base station to create a Virtual Private Cloud (VPC) within a public cloud that includes the base station.

13. The system of claim 8, wherein the instructions further cause the processing resource to:
receive a request to register a private cloud to be supported by an enterprise infrastructure; and
in response to the received request, instruct the base station to discover a plurality of servers within the private cloud.

14. The system of claim 13, wherein the instructions further cause the processing resource to:
identify the base station from among a plurality of geographically distributed base stations based on a geographical location of the private cloud.

15. A non-transitory machine readable medium storing instructions that when executed by a processing resource of a computer system cause the processing resource to:
instruct a base station to install a seed hypervisor management system on a deployment node;
instruct the base station to cause the seed hypervisor management system running on the deployment node to create a hyperconverged infrastructure cluster managed by the seed hypervisor management system; and
instruct the base station to cause the deployment node to install a self-hosted hypervisor management system within the hyperconverged infrastructure cluster, the self-hosted hypervisor management system to manage the hyperconverged infrastructure cluster.

16. The non-transitory machine readable medium of claim 15, wherein the instructions further cause the processing resource to:
instruct the base station to cause the deployment node to register the hyperconverged infrastructure cluster to the self-hosted hypervisor management system; and
instruct the base station to cause the deployment node to delete the seed hypervisor management system from the deployment node.

17. The non-transitory machine readable medium of claim 15, wherein:
the hyperconverged infrastructure cluster includes only two nodes,
the deployment node is included in the hyperconverged infrastructure cluster, and
the hyperconverged infrastructure cluster comprises a high-availability private cloud gateway.

18. The non-transitory machine readable medium of claim 15, wherein the instructions further cause the processing resource to:
instruct the base station to create a Virtual Private Cloud (VPC) within a public cloud that includes the base station.

19. The non-transitory machine readable medium of claim 15, wherein the instructions further cause the processing resource to:
receive a request to register a private cloud to be supported by an enterprise infrastructure; and
in response to the received request, instruct the base station to discover a plurality of servers within the private cloud.

20. The non-transitory machine readable medium of claim 19, wherein the instructions further cause the processing resource to:

identify the base station from among a plurality of geographically distributed base stations based on a geographical location of the private cloud.

* * * * *